(12) United States Patent
Amin et al.

(10) Patent No.: US 10,977,537 B2
(45) Date of Patent: Apr. 13, 2021

(54) BIOMETRIC SMART CARD WITH POWER HARVESTING

(71) Applicants: Kawa Amin, Lund (SE); Ray Perrier, Tecumseh (CA)

(72) Inventors: Kawa Amin, Lund (SE); Ray Perrier, Tecumseh (CA)

( * ) Notice: Subject to any disclaimer, the term of this patent is extended or adjusted under 35 U.S.C. 154(b) by 0 days.

(21) Appl. No.: 16/791,735

(22) Filed: Feb. 14, 2020

(65) Prior Publication Data
US 2020/0302255 A1  Sep. 24, 2020

Related U.S. Application Data

(60) Provisional application No. 62/805,690, filed on Feb. 14, 2019.

(51) Int. Cl.
*G06K 19/07* (2006.01)
*H04B 5/00* (2006.01)
*G06Q 20/34* (2012.01)
*G07F 7/08* (2006.01)

(52) U.S. Cl.
CPC ..... *G06K 19/0704* (2013.01); *G06K 19/0709* (2013.01); *G06K 19/0723* (2013.01); *G06Q 20/341* (2013.01); *H04B 5/0031* (2013.01); *G07F 7/0806* (2013.01)

(58) Field of Classification Search
CPC .......... G06K 19/0704; G06K 19/0709; G06K 19/0723; G06Q 20/341; H04B 5/0031; G07F 7/0806

USPC ......................................................... 235/492
See application file for complete search history.

(56) References Cited

U.S. PATENT DOCUMENTS

| | | | |
|---|---|---|---|
| 9,882,559 B2 | 1/2018 | Amin | |
| 2017/0300799 A1* | 10/2017 | Breed | .................... G07F 7/1016 |
| 2017/0357979 A1* | 12/2017 | Khurana | .............. H04L 63/0853 |
| 2018/0039987 A1* | 2/2018 | Molino | ................... G06Q 20/34 |
| 2018/0373857 A1* | 12/2018 | Larsen | ..................... G06F 21/45 |

OTHER PUBLICATIONS

"The Rise of Biometric Cards", Embedded Security News, 2018.

* cited by examiner

*Primary Examiner* — Daniel A Hess
(74) *Attorney, Agent, or Firm* — Law Office Of Scott C Harris

(57) ABSTRACT

A smartcard device which includes power harvesting. Power is stored. That stored power is used to obtain biometric information on the card. In an embodiment, a smartcard is used in a card reading device, e.g, an ATM machine or other payment device. In one embodiment, the ATM swallows the card completely. In another embodiment, the card can be partly inserted into the machine or read and powered wirelessly. The fingerprint reader is put on the smart card. The client inserts the smart card into a standard ATM. The ATM recognizes a smart card with fingerprint authentication, harvests power and returns the smart card to the user. The Client authenticates their fingerprint using a fingerprint reader powered by harvested power then re-inserts the smart card. If authenticated, the client is prompted to choose one of the menu options.

13 Claims, 5 Drawing Sheets

BIOMETRIC SMART CARD WITH POWER HARVESTING

This application claims priority from provisional application No. 62/805,690, filed Feb. 14, 2019, the entire contents of which are herewith incorporated by reference.

BACKGROUND

Smart cards are used for various transactions. Smart cards can include some information about the user as well as the codes to carry out the transaction.

Smart cards often include powered chips, and hence may need power to carry out their operations. These chips are powered by a machine that read the smart cards.

SUMMARY OF THE INVENTION

The present application describes a special smartcard device which includes power harvesting, storing the harvested power, and then using that stored power to obtain biometric information on the card.

In an embodiment, a smartcard is used in a card reading device, e.g, an ATM machine or other payment device that swallows the card completely. In another embodiment, a machine is used that communicates with the card without taking it in completely.

An embodiment describes using a Smart Card in a standard ATM by putting the fingerprint reader on the smart card, and using the smart card to obtain the fingerprint. Any other biometric reader can be used in place of a fingerprint reader. In addition, the fingerprint reader can read a thumb print. Also The smartcard may be any type of smartcard, for example an access card, a credit card, a debit card, a pre-pay card, a loyalty card, an identity card and so on. This is done without the need to integrate a fingerprint reader in the ATM and without needing to incorporate a battery into the card. This is done by the Client inserting the smart card into a standard ATM. The ATM recognizes a smart card with fingerprint authentication, harvests power and returns the smart card to the user. The Client authenticates their fingerprint using a fingerprint reader powered by harvested power then re-inserts the smart card. If authenticated, the client is prompted to choose one of the menu options.

Other embodiments are described herein.

BRIEF DESCRIPTION OF THE DRAWINGS

In the Drawings:
the figures describe aspects of the invention, as described herein, and specifically.

DETAILED DESCRIPTION

Embodiments describe a system and method as described herein.

In an embodiment is described herein, the system performs a fingerprint authentication using a biometric reader, but does so without requiring an internal battery. The fingerprint authorization is used to verify the biometric characteristics of the user when performing a transaction at a machine such as a card reader terminal or an automated transaction automatic teller machine.

In an embodiment, this can be used in a machine, such as an ATM machine, to allow fingerprint authorization to be carried out as part of the ATM transaction without retrofitting the machine with the fingerprint reader. Rather than retrofitting the machine, the fingerprint reader is put onto the card itself and the fingerprints are taken using a fingerprint reader on the card.

Embodiments also describe stabilizing the power, e.g., when harvested power is low.

An embodiment describes use of the card in an automated teller machine or ATM. However, this can be used in other kinds of machines in which cards of this type are inserted.

Figure 1:
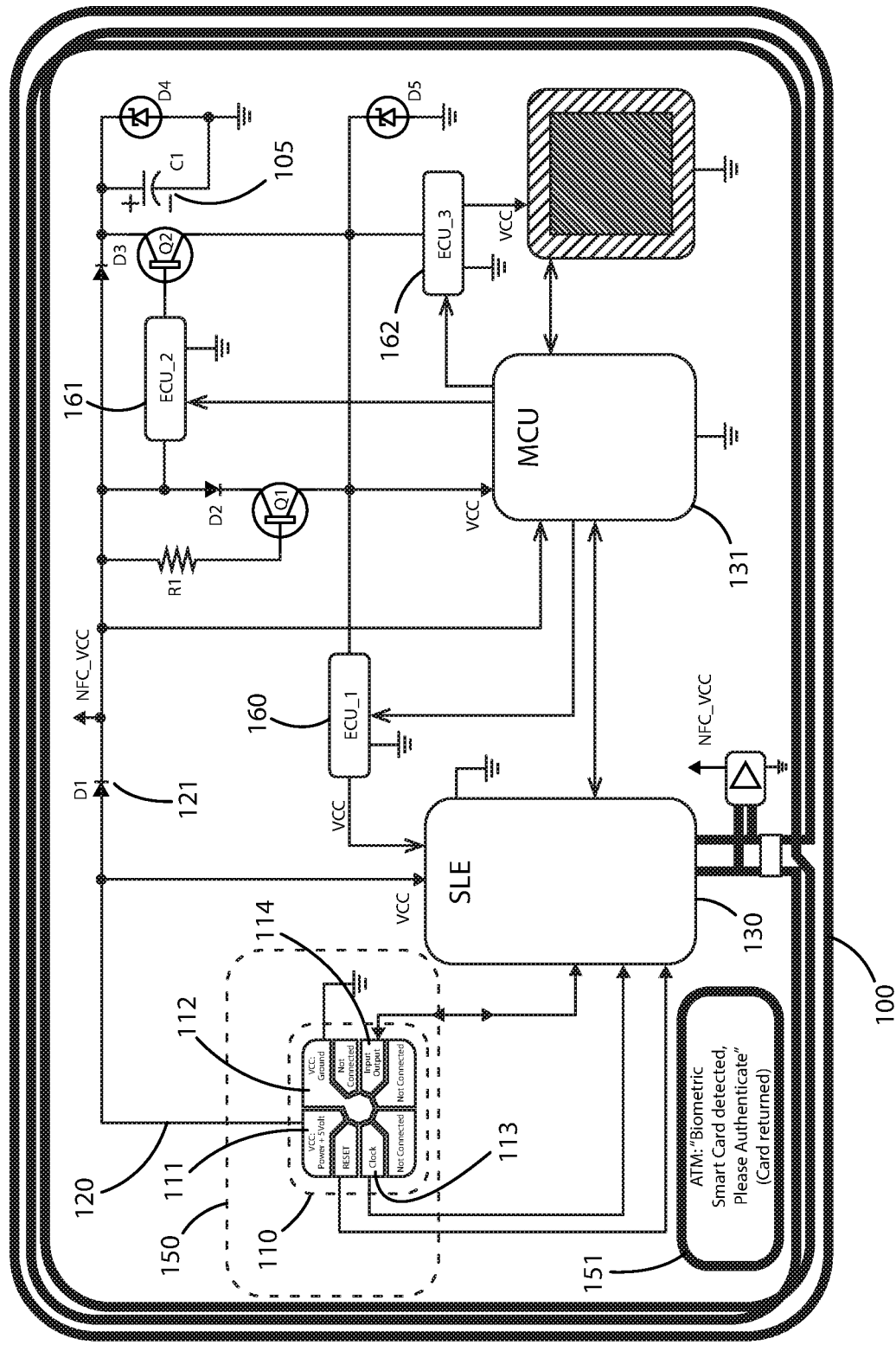
FIG. 1 shows a circuit level diagram of a smartcard being embedded into machine.

FIG. 1 illustrates a circuit level diagram of the smartcard 100, as inserted into an automated teller machine. When connected into the automatic teller machine, the contacts 110 of the smartcard are connected to corresponding contacts 150 of the ATM. In particular, the contacts 110 include a VCC contact 111, a ground contact 112, and an input-output contact 114 as well as a clock contact 113.

When the contacts are connected to power, the power from the VCC provided by the ATM is transferred to the VCC line 120, which places power onto the global VCC bus that controls all of the different circuitry. Power is connected to a smart card controller chip 130, which is in one embodiment, a SLE series chip security chip with data processing and encryption. However, other chips can be used. The power also activates a microcontroller 131. In addition, the power passes through protection diode 121, to the harvesting capacitor 105, the power charges the harvesting capacitor 105, which is isolated by diode D3 so the power in the harvesting capacitor 105 does not discharge until switched on.

In one embodiment, the capacitor can be a super or ultra capacitor.

When the smartcard is inserted into the automated teller machine, the electronic contacts of the smart chip 110 are connected to the computer system in the ATM. The power from the smart chip 110 is then used to charge the capacitor C1. During this time, the ATM also reads data from the smartcard, e.g. from the memories thereon, and determines that the smartcard is a biometric smartcard. The ATM needs to be programmed to operate with a biometric smartcard of the type of the present application and to carry out the functions described in the flowchart of FIG. 5.

All of the devices on the card are relatively low power, so after only a second in the ATM, enough power has been charged on to the capacitor 105 to allow the capacitor 105 to power the fingerprint reader 200.

Figure 5:
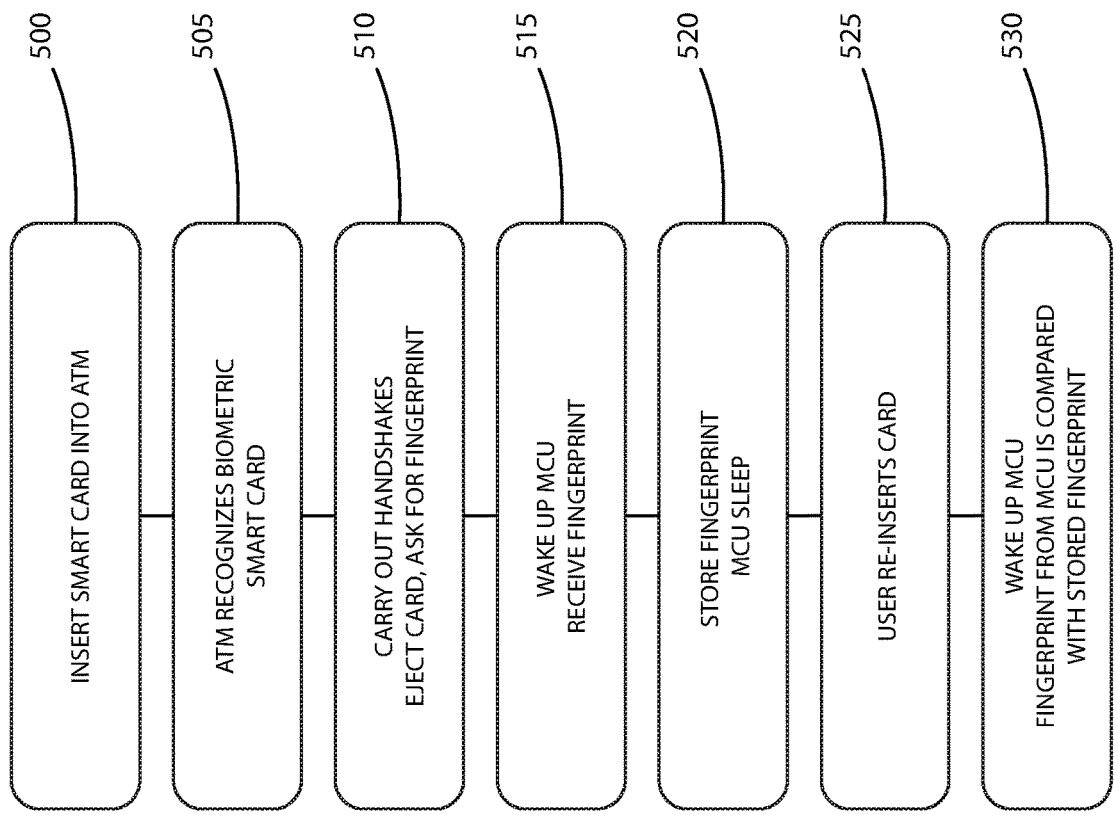
FIG. 5 shows a flowchart of operation.

The operation is shown in the flowchart of FIG. 5. The card is first inserted into the ATM at 500, providing the card in the ATM as shown in FIG. 1 where the card is entirely swallowed by the ATM. The VCC onto connection 111 causes VCC on the line 120, which correspondingly starts the SLE 130 and the MCU 131. These cause different configurations to be recognized by the ATM, and the ATM recognizes a biometric smartcard at 510 and begins its biometric smartcard operation.

This carries out handshaking for example at 510, to determine the type of smartcard. After this amount of time, enough power has been stored onto the capacitor 105.

At 510, The ATM ejects and returns the smartcard to the user and instructs the user that a fingerprint authorization is required in order to complete the transaction. The ATM at this point displays a message shown as 151, that a biometric smartcard has been detected, and the user needs to authenticate.

Figure 2:
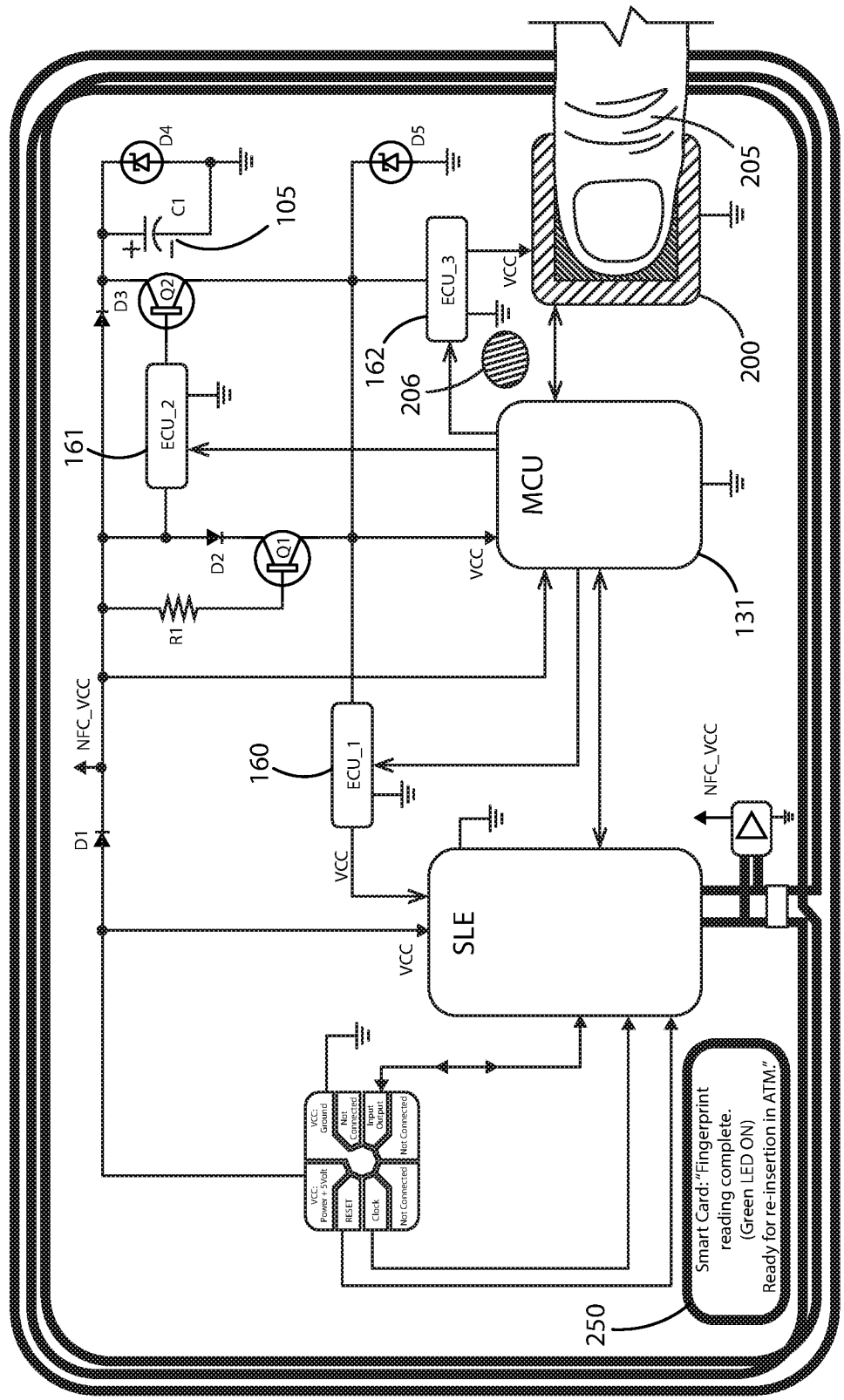
FIG. 2 shows a circuit level diagram showing the smartcard with fingerprint reading being complete.

FIG. 2 illustrates the ejected smartcard. At this point, the ECU 2 161 turns on the power from the capacitor 105 to the MCU 131. Fingerprint reader 200 is also powered from capacitor 105 via ECU 3 162. The user places their finger 205 on the fingerprint reader 200. The MCU 131 comes out of sleep mode to cause the fingerprint reading to be to be performed.

The user's finger on the fingerprint reader 200 causes the smartcard MCU 131 to read the fingerprint at 515. After reading, the MCU 131 goes back into sleep mode while holding the fingerprint data in the internal memory of the MCU 131 at 520. During all this time, the MCU 131 is powered by energy that is stored in the capacitor C1. Hence, the capacitor is sized to be able to power the card for a time effective to allow the card/MCU/fingerprint reader to carry out a fingerprint read.

Once the fingerprint reading is complete, and the MCU 131 goes to a sleep mode, an LED such as a green LED 206 can be illuminated to indicate that the fingerprint reading is complete.

Figure 3:
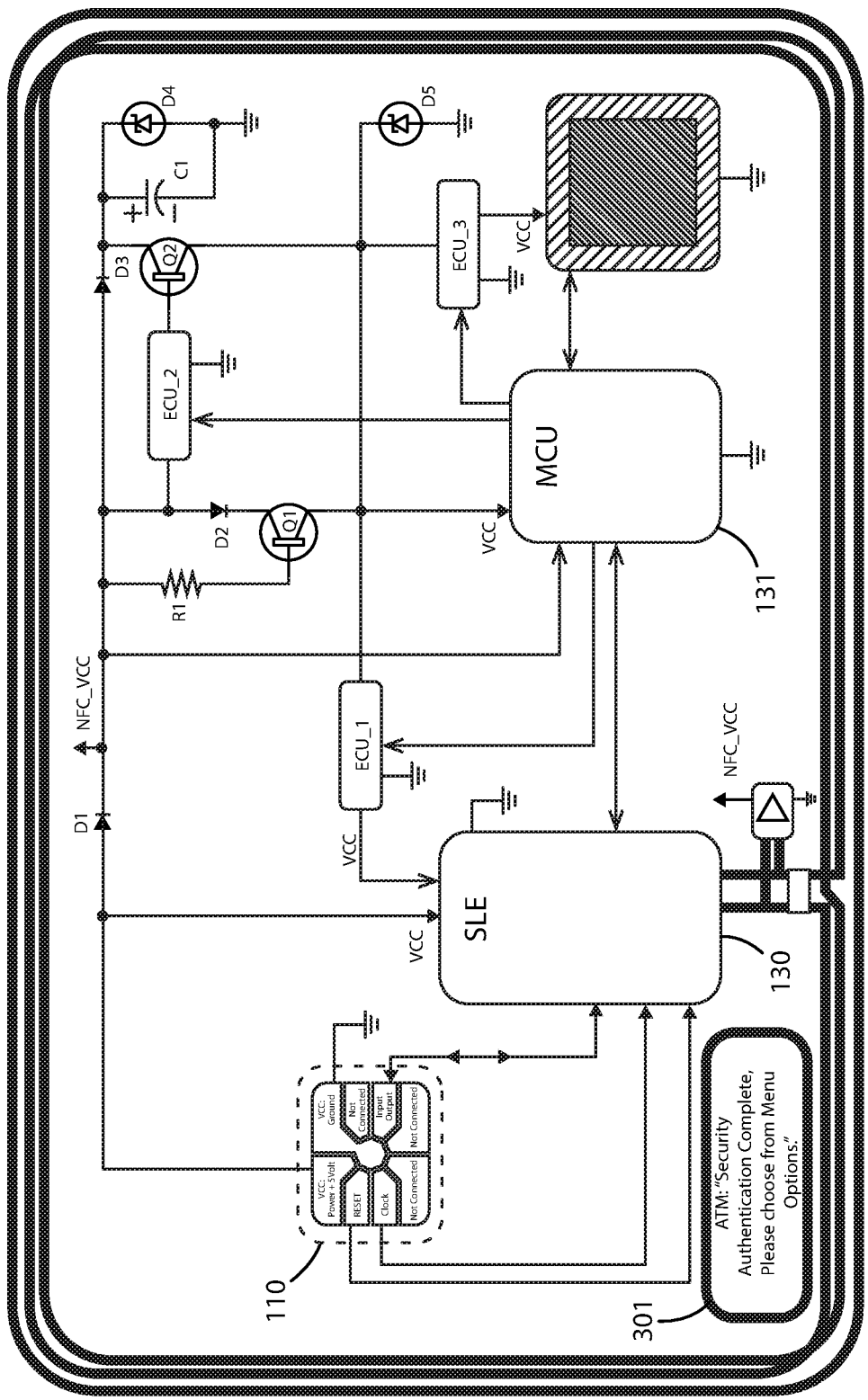
FIG. 3 shows the operations on the machine after the security authorization is complete.

At this time, the user then re-inserts the smartcard into the ATM as shown in FIG. 3 as 525. Reinserting the card causes VCC to be re-applied to the MCU 131. This causes the MCU 131 to wake up and communicate with the security controller 130 also referred to as the "SLE". The security controller 130 compares the fingerprint data received into the MCU 131 with the fingerprint data stored in the SLE 130 to confirm fingerprint authentication at 530. Since the card is inserted again during this time, the chips are being powered by the VCC from the smartcard terminal during this time and all the low-power modes are off.

Once the inserted fingerprint data is verified, the client is prompted on the ATM to choose from the ATM menu options, per message shown as 301. The effect is that the operation is carried out on the card, based on harvested and saved power.

The effect is that the operation is carried out on the card, based on harvested and saved power.

The use of harvested and saved power can also be used for a point-of-sale terminal transaction via a near field communication. The near field communication, or NFC, can be either a strong near field communication or a weak near field communication.

Both kinds of NFC use an embodiment illustrated with reference to FIG. 4. During a weak NFC transaction, the smartcard is placed in close proximity to the point-of-sale terminal, and the smartcard operates to harvest power from this point-of-sale terminal to provide power to the MCU 131 and the SLE 130, and to power on the fingerprint reader, allowing them to operate. During this time, the the capacitor C1 is charged with any extra power. When power becomes low or unstable from the weak or lost NFC field, this is compensated by the stored energy in the capacitor C1.

After fingerprint reading, the capacitor C1 stabilizes the power required for the internal circuits to operate.

An embodiment described herein describes a passive RFID (radio frequency identification) device which harvests power based on its use, and also stores the harvested power.

Figure 4:
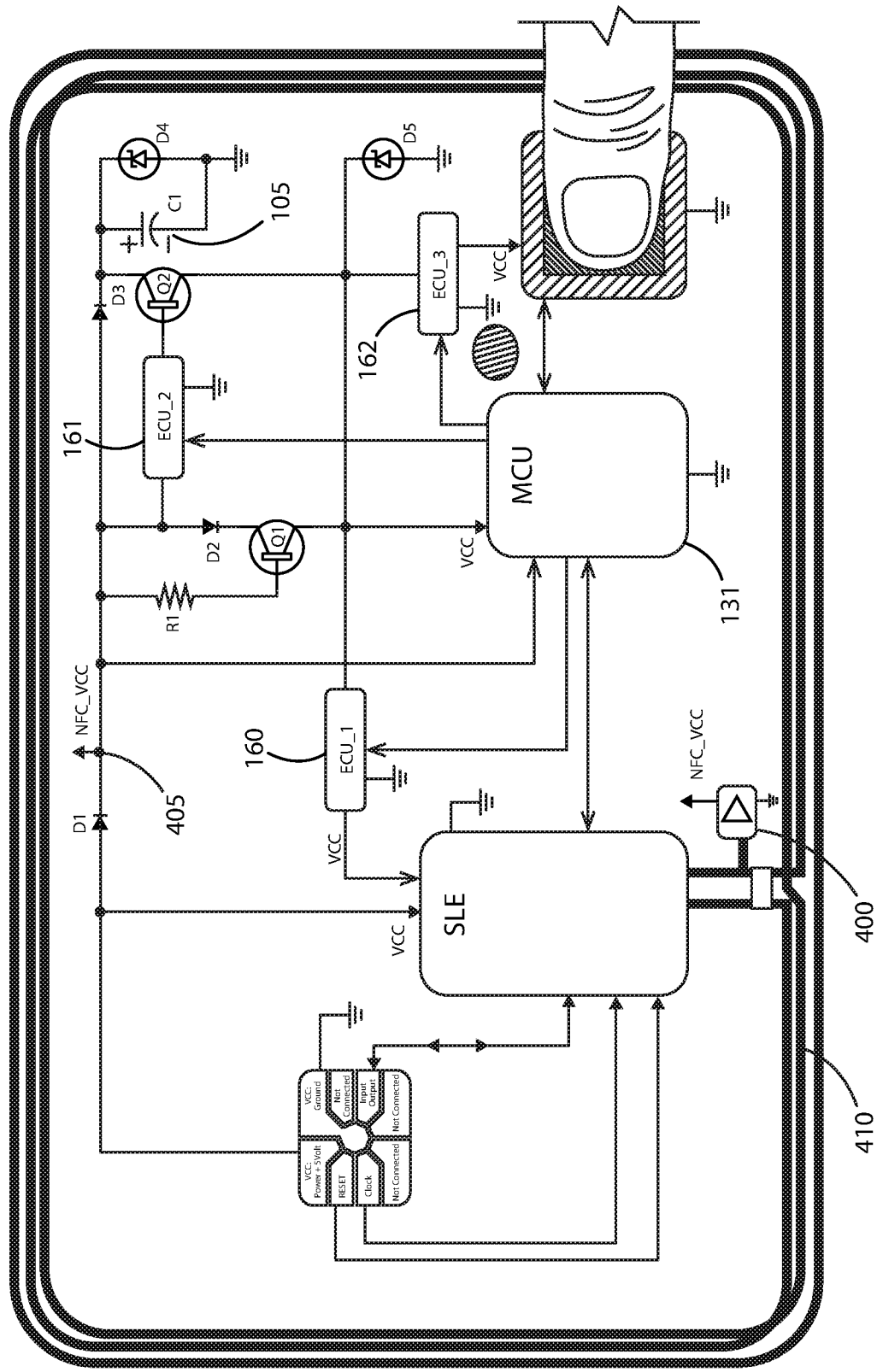
FIG. 4 shows a NFC field being used for fingerprint reading.

FIG. 4 illustrates the power from the weak near field communication being received as 400 via antenna 410, and inserted onto the VCC line which in this case is a near field communication VCC line 405. At the same time, this power is charged onto the capacitor C1 to stabilize the power to power the other circuits if the NFC is removed or becomes less strong.

The strong near field executes in the same way as the weak near field.

In operation of all the embodiments, the micro control unit 131 controls the power requirements needed from the capacitor C1 for the smartcard via the electronic control units ECU 1 160, ECU 2 161 and ECU 3 162. During point-of-sale near Field communication transactions, if the power is below the smartcard nominal voltage requirements, the capacitor C1 compensates for the loss of power using its stored harvested energy. This also helps to speed up the processing time to complete the transaction.

The near field operations can also be carried out with other devices such as a smart phone or the like. For example, the card can be placed near a near field communicating device such as a smart phone, prior to using it in some other application, to allow charging the capacitor C1.

The power on to VCC, as well as the stored energy in the capacitor C1, can also be used to power an optional display on the smartcard device. This can help guide clients with step-by-step authentication information, for example. The onboard display can display messages, for example, shown as 250.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A smartcard system, comprising:
   a smartcard, having a connection to power that is received from an external device which reads the smartcard,
   the smartcard also having operation circuits, including a security circuit and a microcontroller circuit which control functions or the smartcard,
   and the smartcard having a fingerprint reader having a reading surface exposed on a surface of the smartcard,
   and the smartcard having a power storage-device, which is powered from the connection to power, and operative to store power when the power is received from the external device,
   and where the microcontroller provides a program which requires a fingerprint to be input on the fingerprint reader as part of the security function at a time when the smartcard is not connected to power from the external device, and where the fingerprint reader and at least one of the operation circuits operate when the device is not connected to said power, but is powered from the power stored in the power storage device,
   wherein the operating circuits control operation of the smartcard to maintain the microcontroller in a sleep state in which the microcontroller is not consuming power, when the smartcard is not connected to power at a first time,
   the operating circuits control operation of the smartcard to detect a connection to power that causes the power storage device to store power, and to communicate to the external device, the operating circuits control operation of the smartcard, after the connection is no longer connected to power, to bring the microcontroller out of the sleep state to a state where the microcontroller is consuming power, and read a fingerprint while the connection is no longer connected to said power and store information in the microcontroller based on the reading of the fingerprint, and then to put the microcontroller back into the sleep state in which the microcontroller is not consuming power, and the operating circuits control operation of the smartcard to bring the microcontroller out of the sleep state after the read of the fingerprint and when connected to power from the external device, to compare fingerprint data from the read of the fingerprint with stored fingerprint data, and to confirm fingerprint authentication and communicate the fingerprint authentication to the external device.

2. The system as in claim 1, wherein the power storage device is a capacitor and the capacitor is sized to be able to power the card for a time effective to allow the card/MCU/fingerprint reader to carry out a fingerprint read.

3. The system as in claim 1, wherein the connection to power is a wired connection to power.

4. The system as in claim 3, wherein the external device takes only a part of the card inside and leaves another part of the card exposed.

5. The system as in claim 1, wherein the connection to power is a wireless connection to power which is received via near field communication.

6. The system as in claim 1, further comprising an indicator which is changed in state to indicate that the fingerprint read.

7. The system as in claim 1, wherein the security circuit and the microcontroller circuit are each an IC chip.

8. A smartcard system, comprising:
an ATM machine;
a smartcard, having a connection to power that is received from the ATM machine which reads the smartcard,
the smartcard also having operation circuits, including a security circuit and a microcontroller circuit which control functions of the smartcard,
and the smartcard having a fingerprint reader having a reading surface exposed on a surface of the smartcard,
and the smartcard having a power storage device, which is powered from the connection to power, and operative to store power when the power is received from the ATM machine,
and where the microcontroller provides a program which requires a fingerprint to be input on the fingerprint reader as part of the security function at a time when the smartcard is not connected to power form the ATM, and where the fingerprint reader and at least one of the operation circuits operate when the device is not connected to said power, but is powered from the power stored in the power storage device,
wherein ATM prompts a user to to insert the smartcard into the ATM, and to start a program in the smartcard and to store power in the power storage device while the smartcard is in the ATM,
where the ATM subsequently ejects the smartcard;
where after ejection from the ATM, the smartcard obtains a fingerprint using power stored in the power storage device and to store the information from the fingerprint,
where the ATM prompts the user to subsequently insert the smartcard again in the payment machine after the fingerprint has been obtained, when the smartcard is inserted into the ATM to receive power from the ATM, after the fingerprint has been obtained, and
to compare the information stored from the fingerprint with previously stored fingerprint information and to confirm fingerprint authentication and communicate the fingerprint authentication to the ATM.

9. The system as in claim 8, wherein the external device completely takes the card inside without leaving any part of the card exposed.

10. The method as in claim 9, wherein the power storage device is a capacitor.

11. The method as in claim 9, wherein operating circuits including a microcontroller and a security circuit control operation of the smartcard to maintain the microcontroller in a sleep state in in which the microcontroller does not consume power, when the smartcard is not connected to power at a first time, to detect a connection to power in the ATM that causes the power storage device to store power, and to communicate to the ATM, and after the connection is no longer connected to power, to bring the microcontroller out of the sleep state to read the fingerprint while the smart card is not connected to power, and store information in the microcontroller based on the reading of the fingerprint, then to put the microcontroller back into the sleep state.

12. A method of verifying a payment comprising:
a user inserting a smart card into an ATM;
the ATM recognizing the smart card to have fingerprint authentication;
the smart card harvesting power from the ATM into a power storage device in the smart card while inserted;
the ATM returning the smart card to the user,
the user authenticating their fingerprint using a fingerprint reader on a face of the card, and powered by harvested power, while the smart card is no longer connected to the power from the ATM;
information from the fingerprint being stored in a circuit on the smart card;
the user then re-inserting the smart card into the ATM to again power the smart card from the ATM;
the ATM powering the smart card to compare the information from the fingerprint with stored authorized fingerprint information and authenticating the fingerprint if the fingerprint matches the stored fingerprint; and
if authenticated, the client is prompted to choose one of the menu options.

13. The method as in claim 12, wherein the fingerprint stored in the microcontroller is read from the microcontroller when the device is connected to power subsequent to storing information from the fingerprint.

* * * * *